(12) United States Patent
Eicher et al.

(10) Patent No.: US 10,663,197 B2
(45) Date of Patent: May 26, 2020

(54) VARIABLE REFRIGERANT PACKAGE

(71) Applicant: Friedrich Air Conditioning, LLC, San Antonio, TX (US)

(72) Inventors: Kevin L. Eicher, Seguin, TX (US); George C. Cagle, San Antonio, TX (US); Eduardo J. Guerrero, Helotes, TX (US); Bascom Clayton Cotner, San Antonio, TX (US)

( * ) Notice: Subject to any disclaimer, the term of this patent is extended or adjusted under 35 U.S.C. 154(b) by 0 days.

(21) Appl. No.: 15/835,784

(22) Filed: Dec. 8, 2017

(65) Prior Publication Data
US 2018/0106506 A1    Apr. 19, 2018

Related U.S. Application Data

(62) Division of application No. 14/975,166, filed on Dec. 18, 2015, now Pat. No. 10,488,083.

(51) Int. Cl.
| | |
|---|---|
| F25B 13/00 | (2006.01) |
| F25B 49/02 | (2006.01) |
| F24F 13/20 | (2006.01) |
| F24F 1/027 | (2019.01) |
| F24F 3/14 | (2006.01) |
| F25B 41/04 | (2006.01) |
| F24F 11/00 | (2018.01) |
| F24F 13/22 | (2006.01) |

(52) U.S. Cl.
CPC ............ *F25B 13/00* (2013.01); *F24F 1/027* (2013.01); *F24F 3/1405* (2013.01); *F24F 13/20* (2013.01); *F25B 41/046* (2013.01); *F25B 49/02* (2013.01); *F25B 49/025* (2013.01); *F24F 2003/1446* (2013.01); *F24F 2011/0002* (2013.01); *F24F 2013/227* (2013.01); *F25B 2600/021* (2013.01); *F25B 2600/2513* (2013.01); *Y02B 30/741* (2013.01)

(58) Field of Classification Search
CPC ....... F24F 2003/1446; F24F 2001/0051; F24F 2001/004; F24F 13/20; F24F 1/027; F24F 2011/0002; F24F 2013/227; F24F 3/1405; F25B 2600/2513; F25B 13/00; F25B 2600/021; F25B 41/046; F25B 49/02; F25B 49/025
USPC .................................................. 62/176.1, 97
See application file for complete search history.

(56) References Cited

U.S. PATENT DOCUMENTS

| | | | | |
|---|---|---|---|---|
| 4,003,729 A | * | 1/1977 | McGrath | F24F 3/1405 62/186 |
| 4,474,021 A | * | 10/1984 | Harband | F24F 3/1423 62/271 |

(Continued)

FOREIGN PATENT DOCUMENTS

AU    2011100169 A4  *  3/2011  ............ F24F 3/1405

*Primary Examiner* — Filip Zec
(74) *Attorney, Agent, or Firm* — Gunn, Lee, & Cave, P.C.

(57) ABSTRACT

A variable refrigerant package air conditioner is shown that is easy to install in new construction with a unique base that causes collected mixture that overflows to drain outside the building. A control system is shown that has motors and compressor that are pulse width modulated so the air conditioner is infinitely variable while maintaining the highest possible power factor. Dehumidification of outside air occurs as it is mixed with inside air. By gradually approaching a temperature set point and even reheating after dehumidification, moisture is removed from the room.

5 Claims, 13 Drawing Sheets

(56) References Cited

U.S. PATENT DOCUMENTS

| | | | | |
|---|---|---|---|---|
| 4,813,474 | A * | 3/1989 | Umezu | F25B 49/02 |
| | | | | 165/228 |
| 6,065,296 | A * | 5/2000 | Feger | F24F 1/022 |
| | | | | 62/150 |
| 6,070,110 | A * | 5/2000 | Shah | F24F 11/0008 |
| | | | | 165/205 |
| 6,345,513 | B1 * | 2/2002 | Kim | F24F 13/20 |
| | | | | 62/263 |
| 6,826,920 | B2 * | 12/2004 | Wacker | F24F 3/153 |
| | | | | 62/176.6 |
| 7,540,123 | B1 * | 6/2009 | Semmes | E04C 2/292 |
| | | | | 52/783.14 |
| 8,757,506 | B2 * | 6/2014 | Zhou | F24F 1/027 |
| | | | | 236/44 C |
| 9,709,301 | B1 * | 7/2017 | McDonnell | F24F 11/79 |
| 9,726,387 | B2 * | 8/2017 | Karkhanis | F24F 3/1405 |
| 2003/0192331 | A1 * | 10/2003 | Alford | F24F 3/1405 |
| | | | | 62/173 |
| 2005/0109055 | A1 * | 5/2005 | Goetzinger | F24F 13/222 |
| | | | | 62/291 |
| 2005/0235666 | A1 * | 10/2005 | Springer | F24F 3/153 |
| | | | | 62/186 |
| 2006/0225444 | A1 * | 10/2006 | Taras | F24F 3/153 |
| | | | | 62/173 |
| 2007/0169501 | A1 * | 7/2007 | Rios | F24F 13/222 |
| | | | | 62/286 |
| 2008/0022615 | A1 * | 1/2008 | Fox | F24F 13/222 |
| | | | | 52/302.1 |
| 2010/0242508 | A1 * | 9/2010 | Lifson | F24F 3/1405 |
| | | | | 62/115 |
| 2014/0271272 | A1 * | 9/2014 | Jeon | H02M 7/06 |
| | | | | 417/410.1 |

* cited by examiner

VARIABLE REFRIGERANT PACKAGE

CROSS-REFERENCE TO RELATED APPLICATIONS

This application is a divisional application claiming priority to parent U.S. patent application Ser. No. 14/975,166, filed on Dec. 18, 2015.

BACKGROUND OF THE INVENTION

1. Field of the Invention

This invention relates to a variable refrigerant package (VRP), and more particularly, to a variable refrigerant package that may be quickly installed in new construction.

2. Description of the Prior Art

A package terminal air conditioner (PTAC) and a vertical packaged air conditioner (VPAC) are types of self-contained heating and air conditioning systems commonly found in hotels or motels. Most PTAC and VPAC units are designed to go through a wall having vents and/or heat sinks both inside and outside. While PTACs and VPACs are commonly used to heat or cool a single living space, there are cooling only PTACs and/or VPACs with an external heating source. On some PTACs/VPACs condensate drain piping is not required because the condensate water extracted from the air by the evaporator coil is thrown by the condenser fan onto the condenser coil surface where it evaporates. Conventional PTACs/VPACs still require condensate drain piping to be installed.

Through-the-wall units such as PTACs/VPACs have some basic problems. The through-the-wall units do not ventilate the space in which the air is being conditioned. If provisions are made to ventilate the space being conditioned, then humidity is introduced into the space being conditioned. For example, in coastal areas, motels/hotels have a tendency to have a musty smell due to the humidity. The problem is the unit does not run long enough to remove the moisture from the space being conditioned. Yet, building codes require ventilation of the areas being conditioned which PTAC/VPAC units do not normally provide.

While there have been various attempts to reduce the humidity inside of the space being conditioned, such attempts normally require ancillary devices or systems other than the PTAC/VPAC unit. Some require separate dehumidifiers that have to be connected to a building drain. Others require separate dehumidified air being forced into the conditioned space. Each of these systems are either complicated, expensive, or do not work properly.

The standard air conditioner as it is cooling a particular space only responds to the temperature inside the space. Once the space's temperature is satisfied, the active cooling and dehumidification of the space stops. Humidity in the space continues to build. One solution to address the dehumidification and ventilation that has been used in the hotel/motel industry was to have duct work connecting a source of dehumidified outside air to the enclosed spaced. The dehumidified outside air is forced through the duct work into the room. The increased pressure caused by forcing the dehumidified outside air into the room being conditioned escapes through leakage points such as around the entry door and through the room exhaust. However, this method requires the running of additional duct work and having a dehumidifier to remove moisture from the outside air.

Another common method that was used was to have a flap inside of a PTAC unit that is opened to allow outside air to be brought in. However, the outside air was not dehumidified which adds humidity to the space and would many times cause a musty smell inside of the room. Many times after inspection the outside air flap was simply bolted shut.

Another variation of the room air conditioner is what is called a variable refrigerant flow system (VRF). Those systems have very large outdoor condensers and multiple indoor evaporators with refrigerant tubing being run to every space being cooled. Still, the variable refrigerant flow systems continue to have problems with high humidity and lack of available ventilation air.

SUMMARY OF THE INVENTION

It is an object of the present invention to provide a variable refrigerant package (VRP).

It is another object of the present invention to provide effective dehumidification of a conditioned space using a variable refrigerant package.

It is still another object of the present invention to provide variable, yet stable, power to the power consuming parts of a variable refrigerant package.

It is yet another object of the present invention for a contractor when building a hotel/motel to install external connections for a variable refrigerant package so that a non-skilled person can install the variable refrigerant package to provide cooling of an enclosed space.

It is another object of the present invention to provide a new base for a variable refrigerant package.

It is still another object of the present invention to provide a control system for a variable refrigerant package, which control system dehumidifies the air inside of the closed space.

It is yet another object of the present invention to dehumidify outside air before it is added to the air in the enclosed space.

It is still another object of the present invention to modulate the power being supplied to the compressor and/or fans of a variable refrigerant package.

It is another object of the present invention to use pulse width modulation on the compressor and motors contained within a variable refrigerant package, which pulse width modulation is used to slowly bring the variable refrigerant package slowly to the inside temperature set in the room sensor to allow for increased dehumidification of the inside air.

It is yet another object of the present invention to provide a reheat system to provide extra dehumidification by the evaporator.

It is a further object of the present invention to actively control the power factor of the variable refrigerant package for reduced power consumption.

DESCRIPTION OF THE PREFERRED EMBODIMENT

Figure 1:
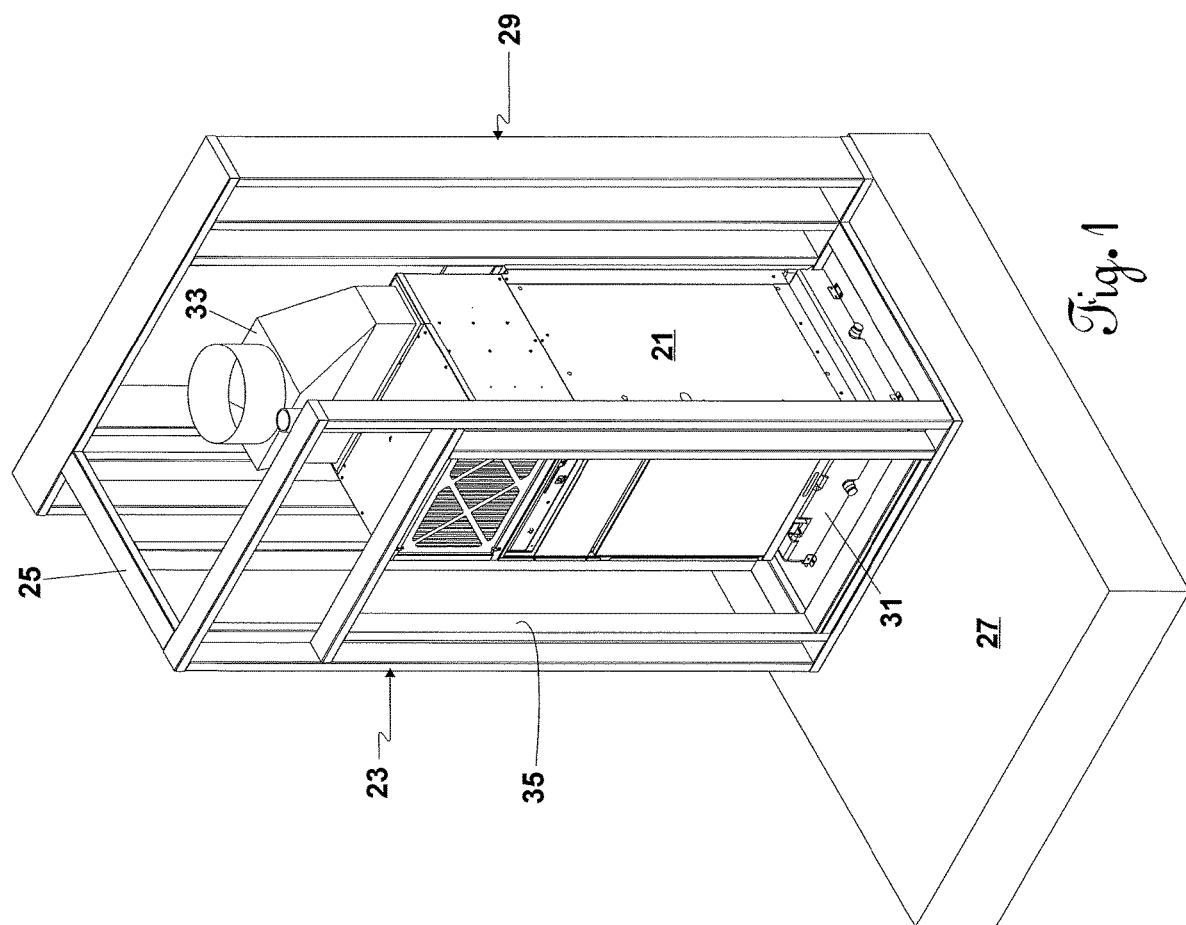
FIG. 1 illustrates a variable refrigerant package fitting inside a closet.

A preferred embodiment of the present invention will be given herein below in conjunction with the illustrations shown in the attached figures. A variable refrigerant package 21 is shown in FIG. 1 installed in a closet 23 formed by frame 25 on floor 27 of a space to be cooled. Frame 25 extends to the outside 29 of the space being cooled. For illustration purposes, the sheetrock or other covering material for the frame 25 has been removed.

Inside of the closet 23 is installed a base 31 on which the variable refrigerant package 21 sits. A duct adapter 33 is installed near the top of the closet 23 for connection to the top of the variable refrigerant package 21 to direct the conditioned air to a desired location. The variable refrigerant package 21 is inserted into the closet 23 through door opening 35.

Figure 2:
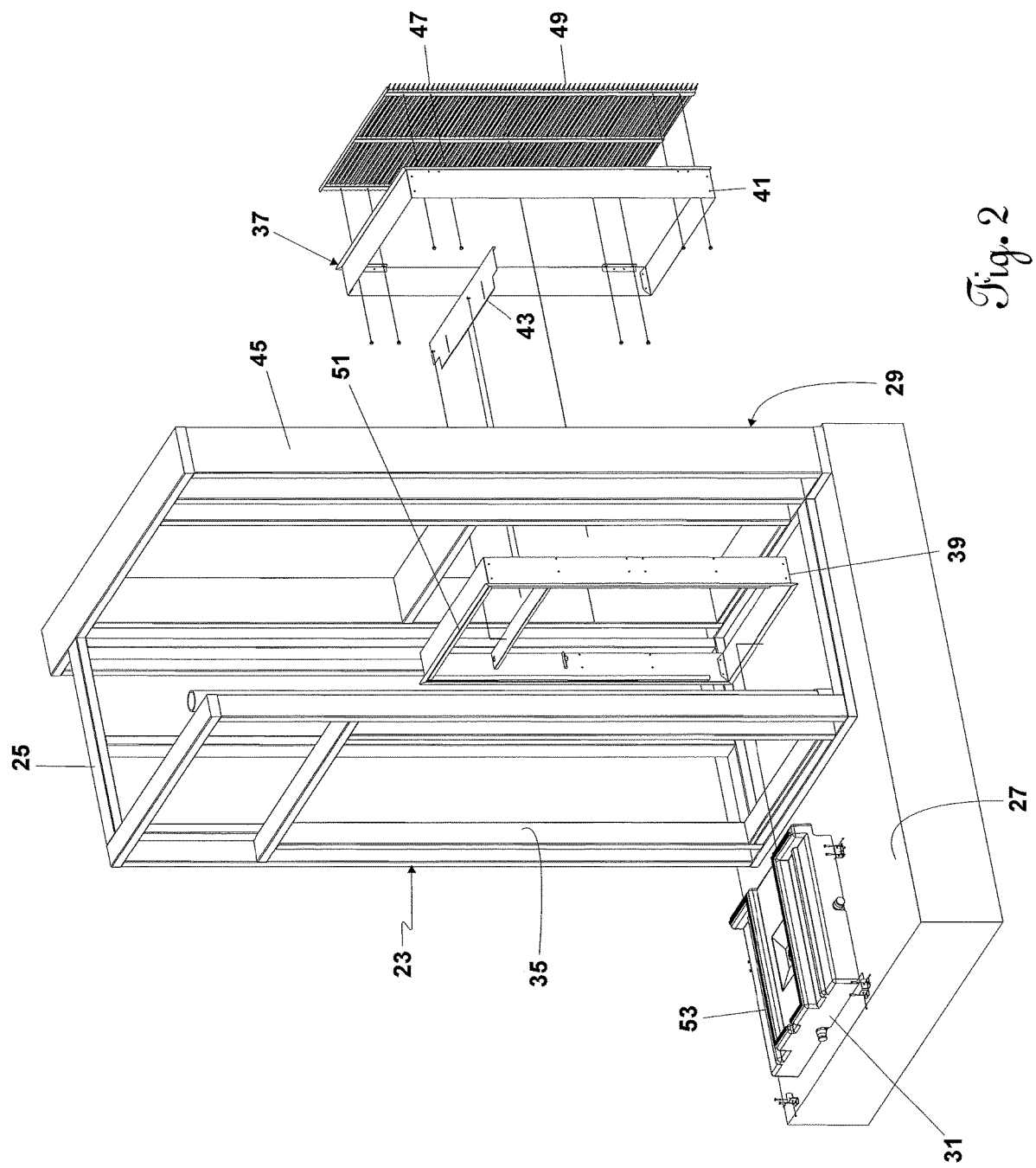
FIG. 2 is an exploded perspective showing how a plenum and base are installed in a framed (but not enclosed) closet for receiving a variable refrigerant package.

Referring now to FIG. 2, the variable refrigerant package 21 has been removed. During construction of the closet 23 by the contractor building the hotel/motel, a plenum 37 is installed that has an interior wall plenum 39 that telescopes inside of exterior wall plenum 41. The lower portion of both the interior wall plenum 39 and exterior wall plenum 41 slopes downward toward the outside 29. A plenum divider baffle 43 is located inside of the interior wall plenum 39 and exterior wall plenum 41. The plenum 37 extends from the outside 29 to the inside of closet 23. Because of the telescoping feature of the plenum 37, varying widths of the outside wall 45 can be accommodated with typical widths being between four to eight inches. An outdoor louvre grill 47 covers the outside opening of plenum 37. The outdoor louvre grill 47 has downwardly sloped louvres 49 to keep rain from entering through plenum 37.

In addition to installing the plenum 37 through outside wall 45, a contractor building the hotel/motel will install base 31 inside of closet 23. The outer portion of the base 31 will extend over the inside lower edge of interior wall plenum 39 in a manner as will be subsequently described.

To provide good sealing contact with the variable refrigerant package 21 (shown in FIG. 1), a plenum gasket 51 is located on the inside of interior wall plenum 39. To seal with the bottom of the variable refrigerant package 21, a base gasket 53 is provided on the top edge of base 31.

Figure 3:
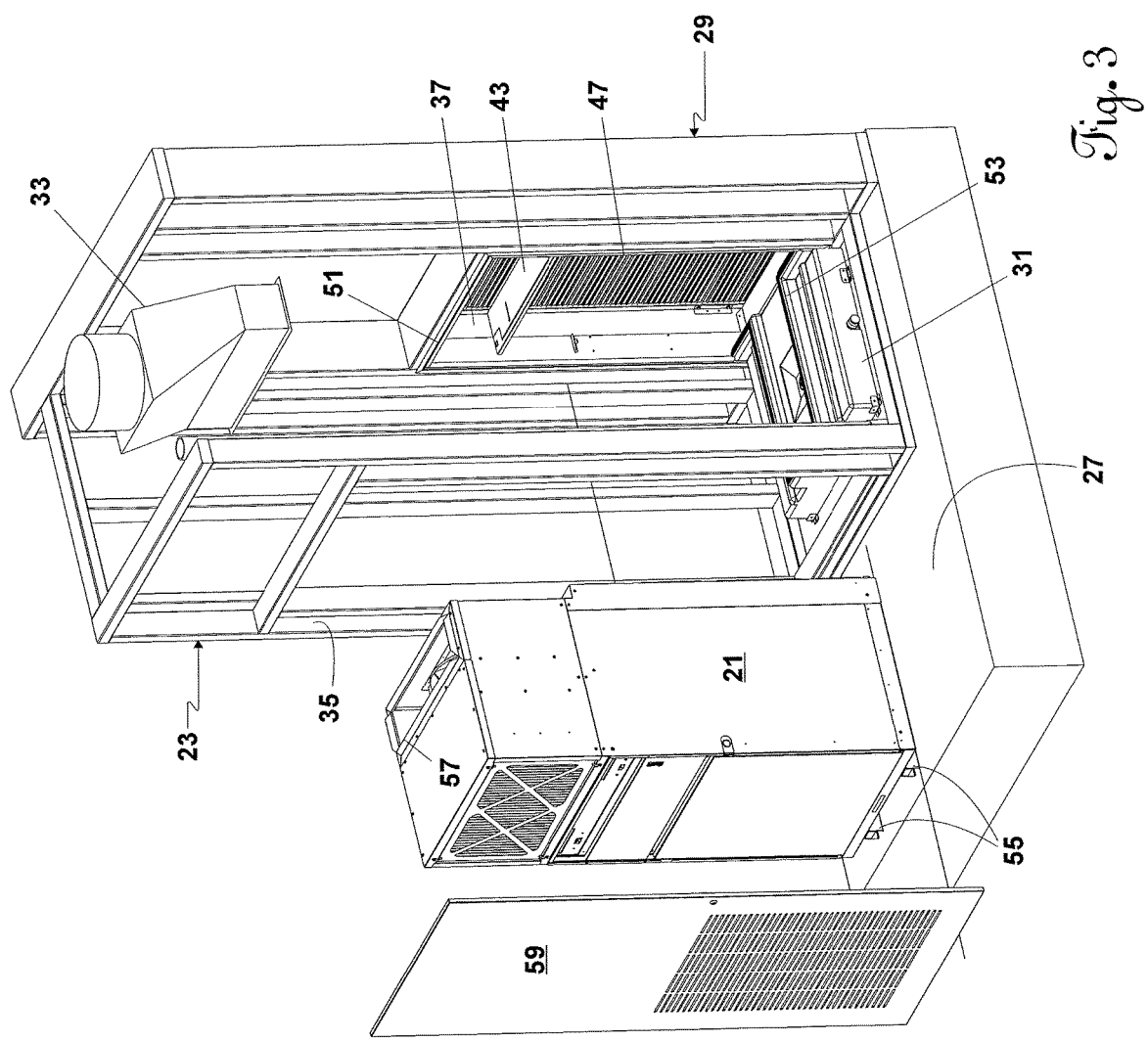
FIG. 3 is an exploded pictorial illustration showing how the variable refrigerant package is inserted into a framed (but not enclosed) closet.

In FIG. 3, the installation of the variable refrigerant package 21 inside of the closet 23 is illustrated. The variable refrigerant package 21 is inserted through the door opening 35. Installation rails 55 are mounted on the bottom of the variable refrigerant package 21 to slide in grooves in the top of base 31 until the variable refrigerant package 21 slides through and presses against the plenum gasket 51 to provide a good seal between the plenum 37 and the variable refrigerant package 21. The bottom of the variable refrigerant package 21 rests on the base gasket 53. After the variable refrigerant package 21 is in place, duct adapter 33 moves downward to enclose supply duct flanges 57.

While not shown in FIGS. 1 through 3, closet 23 will be wired by the contractor with electricity so the variable refrigerant package may be plugged in for power. Also, a connection (not shown) is provided in closet 23 to the room sensor. By installing the return air door 59 in the door opening 35 of the closet 23 and plugging into power and the room sensor, the variable refrigerant package 21 as shown in FIG. 3 is ready for operation. The installation of the variable refrigerant package 21 can be completed by non-certified personnel.

Figure 4:
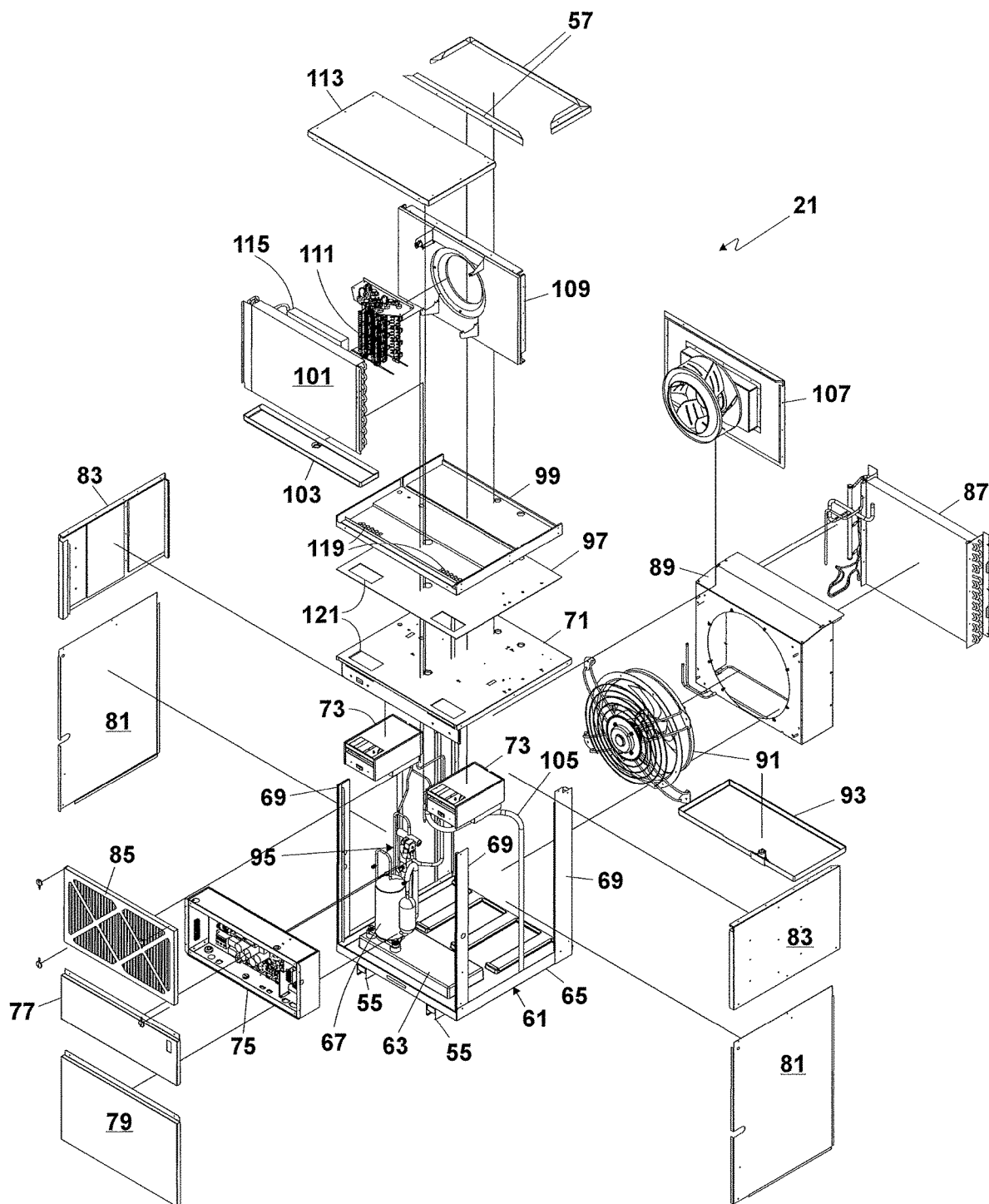
FIG. 4 is an exploded perspective view of a variable refrigerant package.

FIG. 4 shows an exploded perspective view of the mechanical parts of the variable refrigerant package 21. The condenser base assembly 61 has a drain tray 63 in the bottom thereof, which rests on base 65. Below base 65 are located the installation rails 55. Compressor 67 rests on the drain tray 63, which is supported by the base 65.

Extending upward from the base 65 are corner posts 69. On the top of corner posts 69 is located the condenser top cover 71. Connected to the underside of the condenser top cover 71 are fresh air modules 73, which will be discussed in more detail subsequently. Control box 75 is located between corner posts 69. Adjacent the control box 75 is control box cover 77. Located below the control box cover 77 is condenser access panel 79. Lower side covers 81 enclose the sides of the condenser base assembly 61. Upper side covers 83 enclose the upper sides of the variable refrigerant package 21. Any return air coming back into the variable refrigerant package 21 has to enter through the return air filter 85.

Located within the condenser base assembly 61 are the condenser 87 and the condenser shroud 89. The condenser fan assembly 91 is located within the condenser shroud 89 and blows air through the condenser 87. Condenser drain pan 93 will collect any moisture that drips off of condenser 87 or the evaporator drain pan 103. Located above the compressor 67 is the reversing valve assembly 95.

Located above the condenser top cover 71 is an insulation plate 97, which is mounted between the condenser top cover 71 and the evaporator base 99. Located above the evaporator base 99 is evaporator 101 with an evaporator drain pan 103 there below. Connecting from the evaporator drain pan 103 to the bottom of the variable refrigerant package 21 is evaporator drain tube 105.

To draw air through the evaporator 101, a blower assembly 107 draws air through blower inlet panel 109. Between the blower inlet panel 109 and the evaporator 101 is located electric heater 111. Allowing access to the electric heater 111 is heater access panel 113.

Conditioned air after flowing through evaporator 101, electric heater 111, blower inlet panel 109 and blower assembly 107 leaves through supply duct flanges 57 as previously described in conjunction with FIG. 3. A reheat coil 115 is located behind the evaporator 101.

Figure 5:
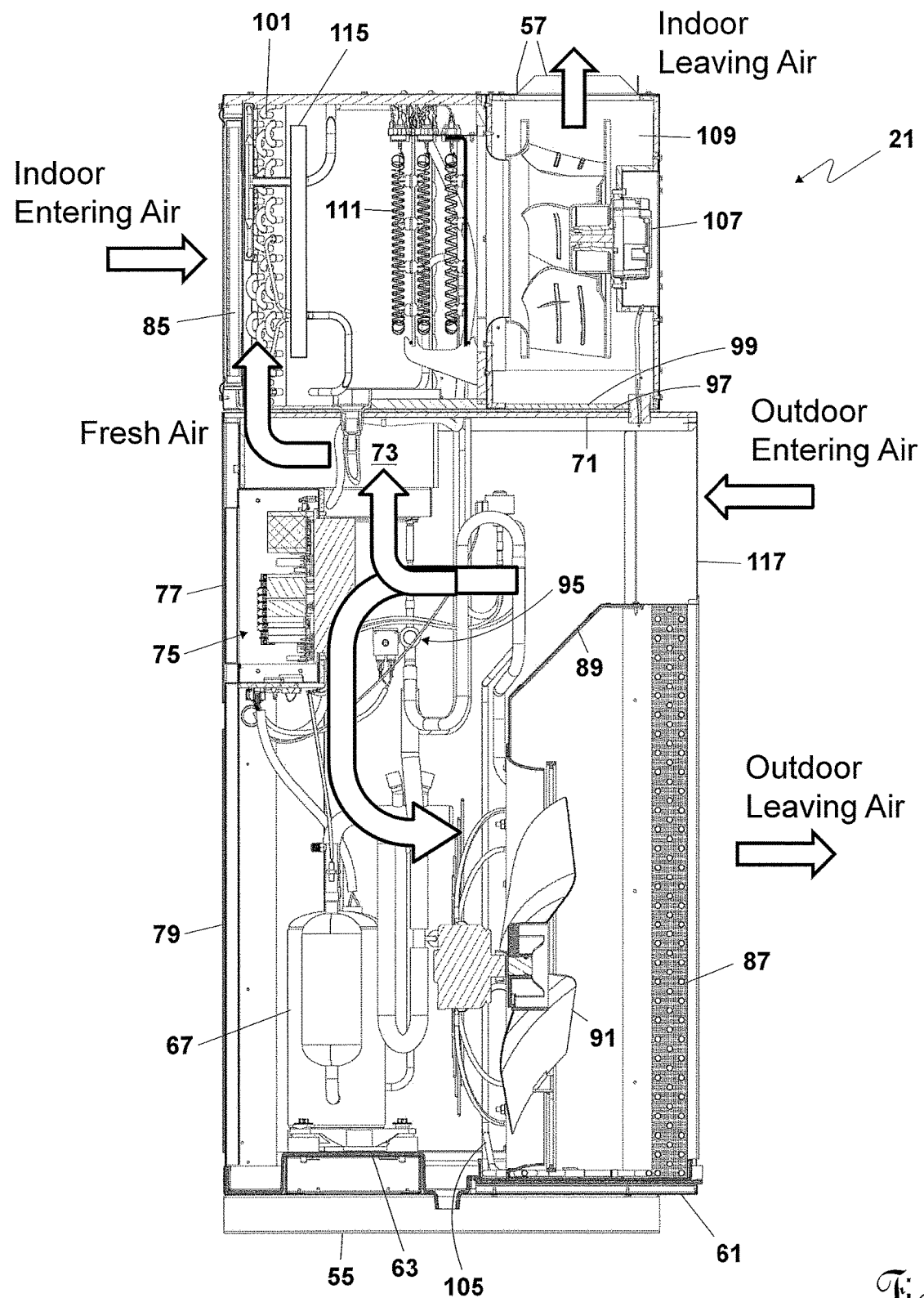
FIG. 5 is a sectional view illustrating air flow in the variable refrigerant package.

Referring now to FIG. 5, a pictorial cross-sectional view of the variable refrigerant package 21 is shown. The same numbers as applied to prior component parts described in FIGS. 1 through 4 will be used in FIG. 5. The blower assembly 107 brings indoor entering air across the return air filter 85, evaporator coil 101, reheat coil 115 and out blower inlet panel 109 to give indoor leaving air. Any moisture that is collected drains out through evaporator drain tube 105.

Outdoor entering air is drawn in through outdoor air inlet 117 by the condenser fan assembly 91 with the majority of the air blowing out through the condenser shroud 89 and through condenser 87 to give outdoor leaving air. The flow of the outdoor air provides cooling for the control box 75 as well as removing heat from condenser 87.

A small amount of the outdoor entering air flows through the fresh air module 73. Rectangular openings 121 and honeycomb openings 119 (see FIG. 4) in evaporator base 99 allows the fresh air to flow there through. From the honeycomb openings 119, the fresh air flows to the inlet side of evaporator 101. Therefore, excess moisture in the fresh air is removed as the fresh air flows through the evaporator 101. To ensure that an appropriate amount of fresh air is being drawn into the space being cooled, each of the fresh air modules 73 have fans inside of them to control the fresh air flow, as will be described in more detail subsequently. The fresh air entering through the fresh air module 73 is cooled and dehumidified by the evaporator 101. The fresh air is mixed with the indoor entering air, cooled and dehumidified with the evaporator 101 with any moisture being collected by evaporator drain panel 103 and discharged out the evaporator drain tube 105.

During the heating mode for the variable refrigerant package 21, electric heaters 111 may be turned ON to heat the indoor entering air. If humidity needs to be removed from the fresh air, the evaporator 101 is operated just enough to remove the humidity. The reheat coil 115 will provide any reheating necessary due to the operation of the evaporator 101 in removing humidity.

Figure 6:
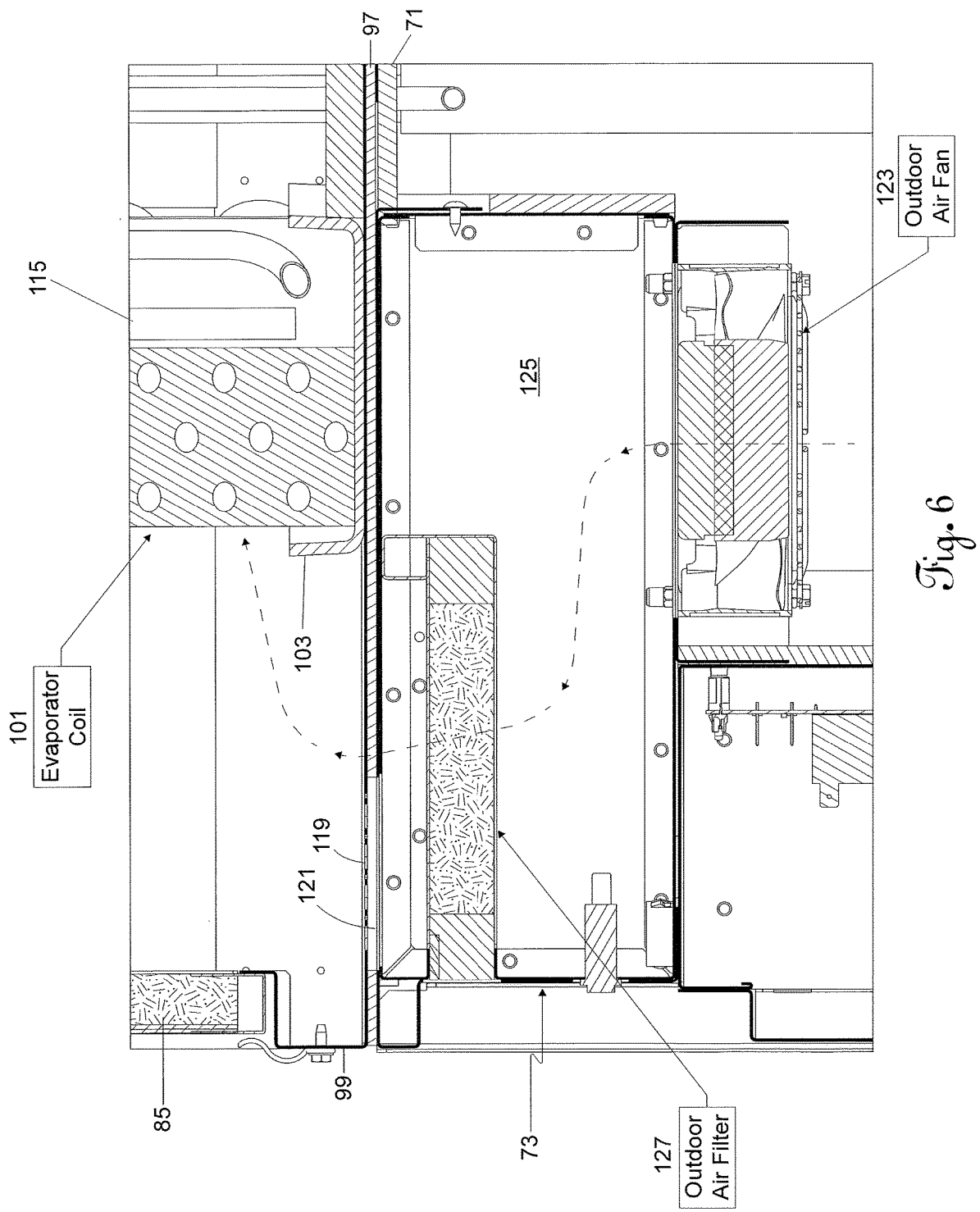
FIG. 6 is an enlarged partial sectional view of FIG. 5 illustrating how outside air entering the room being conditioned is dehumidified.

Referring to FIGS. 5 and 6 in combination, FIG. 6 shows an enlarged, cross-sectional view of one of the fresh air modules 73. The fresh air module 73 has an outdoor air fan 123 for drawing air into fresh air chamber 125. The outdoor air fan 123 has a housing, fan blade and motor very similar to a computer-style fan. From the fresh air chamber 125 fresh air flows through outdoor air filter 127. Rectangular openings 121 and honeycomb openings 119 allows some of the outdoor entering air to be mixed with indoor entering air in front of the evaporator coil 101. The mixed air streams of outdoor entering air and indoor entering air are then conditioned to whatever condition the variable refrigerant package 21 is set. The mixed air can be cooled, dehumidified or heated. If dehumidified, the evaporator drain pan 103 will collect the moisture which is subsequently discharged out evaporator drain tube 105 (see FIGS. 4 and 6). Any air entering the air conditioned space is filtered by the outdoor air filter 127 or, upon recirculation, by the return air filter 85.

Traditional air conditioners simply control the temperature of the space being cooled. They turn ON or OFF based upon the temperature set point inside the space being conditioned. The traditional air conditioner may not run long enough to remove moisture from the space. Most traditional air conditioners do not bring fresh air into the space being cooled. Fresh air is required for the occupants to breathe and to displace noxious fumes, plus bring oxygen into the space being conditioned.

The present invention brings fresh air into the space being conditioned and by a sophisticated control system that coordinates the motors and compressor allows the variable refrigerant package 21 to run longer so that it will cause more dehumidification of the air. As the space being conditioned gets closer and closer to the desired temperature, the motors and compressor are slowed down so that the unit will run longer to dehumidify the space being conditioned.

The variable refrigerant package 21 varies its ability to cool the enclosed space by two distinct methods. In the first method, the variable refrigerant package 21 reduces its capacity or ability to cool by varying the speeds of the motors or compressor as the conditioned space approaches the desired temperature. The second method is to add some reheat back to the space being cooled as is provided by the re-heater coil 115. In the reheat method, the evaporator 101 is allowed to continue to run and remove moisture from the air, but heat is then added back through re-heater coil 115. In this method the conditioned space is being actively dehumidified.

Figure 7A:
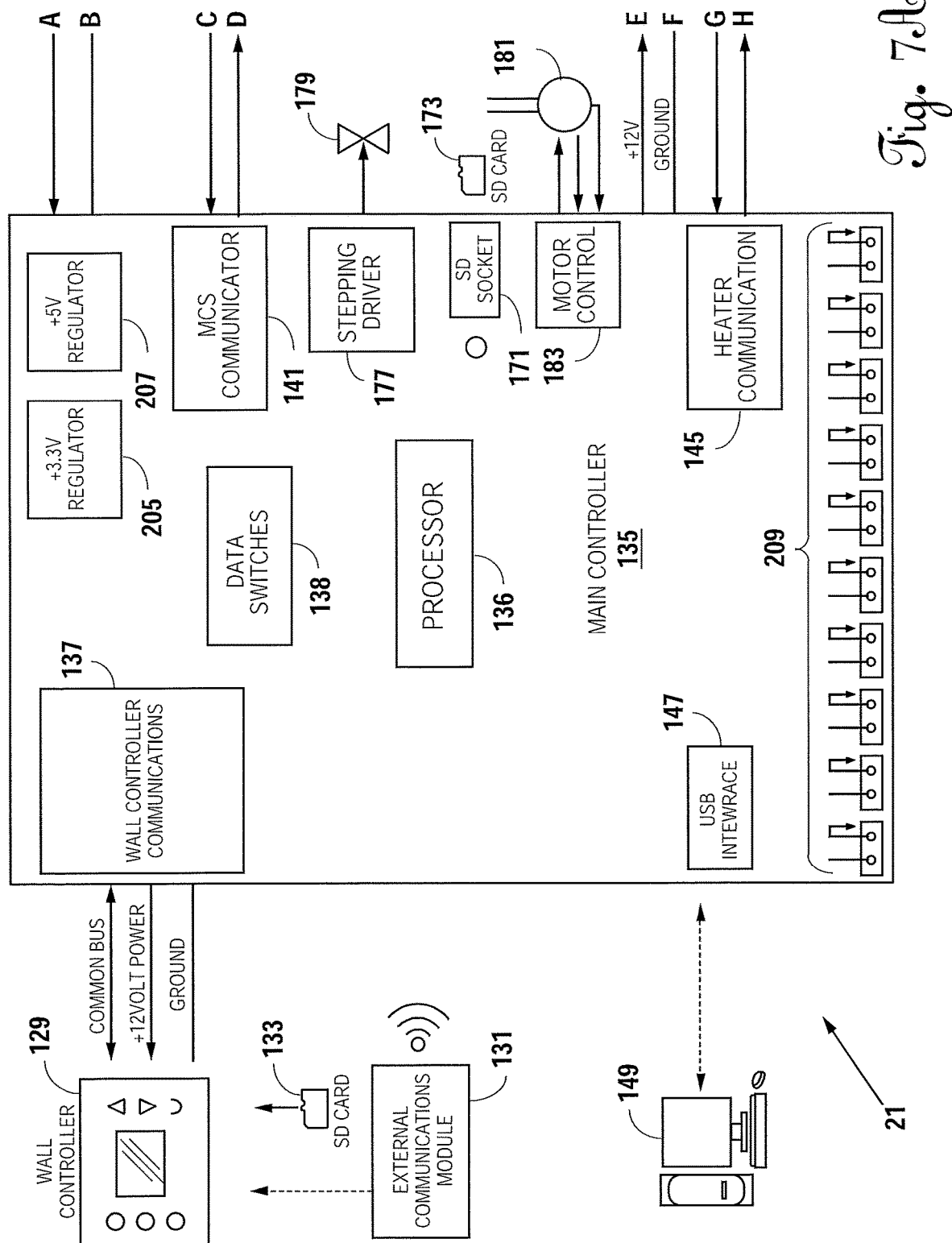
FIGS. 7A and 7B are pictorial block diagrams of controls for a variable refrigerant package.
Figure 7B:
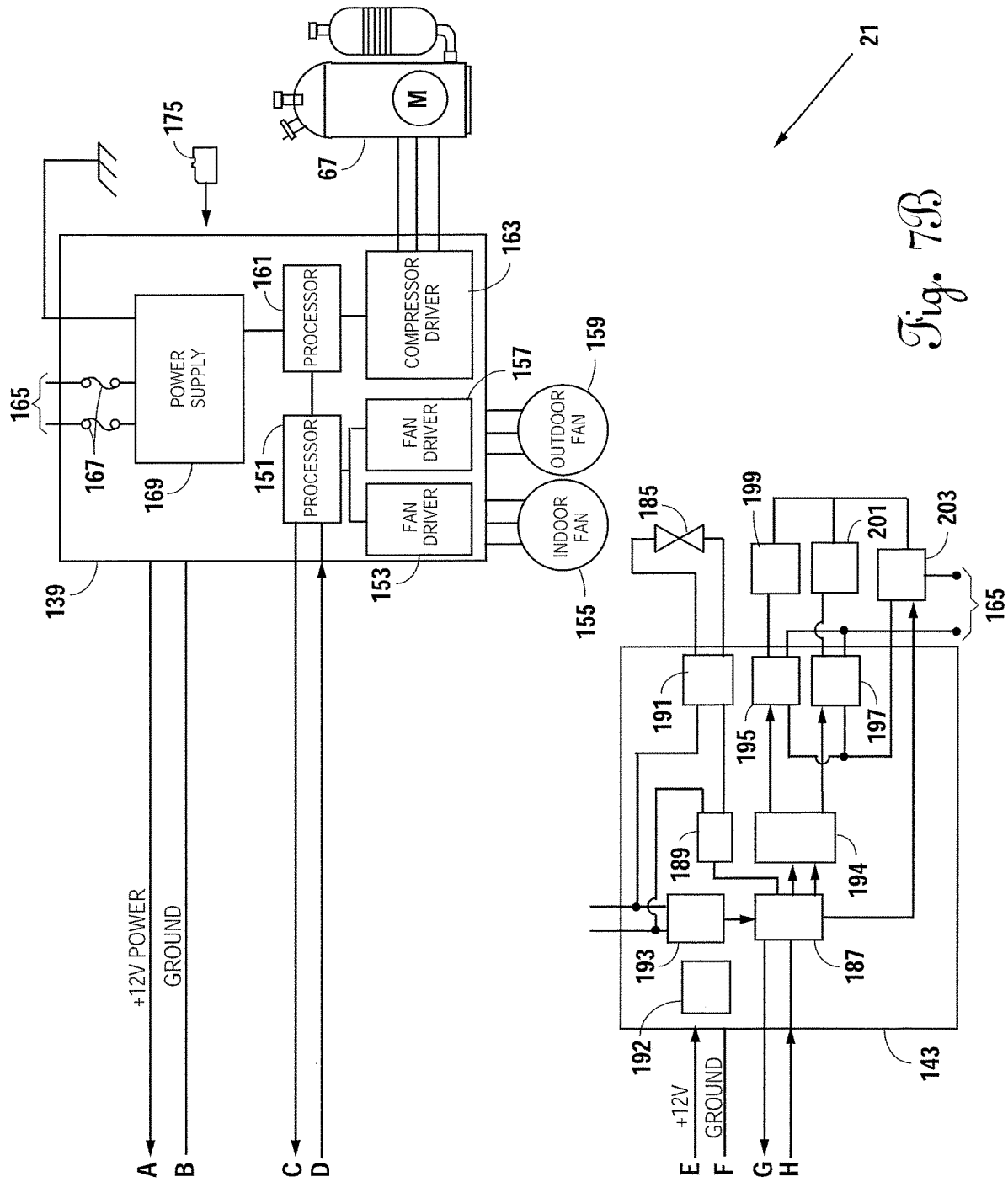

The electrical controls for the variable refrigerant package 21 are illustrated in FIG. 7. A wall controller 129, commonly called a thermostat, sets the desired temperature inside of enclosed space. The wall controller 129 may be communicated with through an external communications module 131. Also, setting up the operating parameters of the variable refrigerant package 21 may be done with SD card 133. The wall controller 129 communicates with the main controller 135. The main controller 135 has a wall controller communications 137 for communicating with the wall controller 129. The main controller 135 has a processor 136 in which provisional data may be programmed by data switches 138.

The main controller 135 communicates with motor control system 139 via MCS communication 141. Also, main controller 135 communicates with heater board 143 via heater communication 145. The main controller 135 could be referred to as the master unit with the motor control system 139 and/or the heater board 143 being referred to as slave units. Both the motor control system 139 and the heater board 143 receive commands from the processor 136 in the main controller 135. If a problem is detected in either the motor control system 139 or the heater board 143, the message is communicated back through the main controller 135 and is displayed on the wall controller 129. The wall controller 129 may receive commands or send commands back and forth with the main controller 135, plus having an external communications module 131.

The main controller 135 has a USB interface 147 for communicating with a personal computer 149. The personal computer 149 may be programmed to set data points in the main controller 135, retrieve data, send commands, or remotely control the entire variable refrigerant package 21. Also, the personal computer 149 may be used to do monitor control tests to make sure the variable refrigerant package 21 is operating properly. Any error history in the main controller 135 may be downloaded and observed in the personal computer 149. The personal computer 149 may be used for troubleshooting or upgrading software in the main controller 135. The parameters set in the main controller 135 can be changed through the personal computer 149.

Inside of the motor control system 139, processor 151 controls fan driver 153 that operates the indoor fan 155. By providing pulse width modulation to the indoor fan 155, the speed of the indoor fan 155 and its power consumption is controlled. Also, processor 151 controls the fan driver 157 for the outdoor fan 159. The indoor fan 155 is the same as blower assembly 107 shown in FIGS. 4 and 5. Outdoor fan 159 is the same as condenser fan assembly 91 shown in FIGS. 4 and 5.

Processor 161 inside of motor control system 139 operates a compressor driver 163 that in turn operates the compressor 67. By pulse width modulation from the processor 161 via the compressor driver 163, the speed of the compressor 67 may be varied.

Outside power feeds through power input lines 165 and fuses 167 to the power supply 169. The power supply 169 has power factor correction therein as will be subsequently described in conjunction with FIGS. 8 and 9.

Service personnel that may work on the variable refrigerant package 21 will probably not have a personal computer 149 to connect through USB interface 147. Therefore, an SD socket 171 is provided to receive SD card 173. The SD card 173 may be used to upgrade the program or firmware inside of the main controller 135. Also, the SD card 173 may be used for troubleshooting or downloading the history of the operation of the variable refrigerant package 21. The SD card 173 can also provide extra memory for the main controller 135.

The motor control system 139 may have its own SD card 175. By having the SD card 173 in the main controller 135 and SD card 175 in the motor control system 139, extra memory is provided for a remote upgrade. If the motor control system 139 is being upgraded from the wall controller 129, SD card 175 needs to be installed to provide as a temporary memory storage space while the motor control system 139 is being upgraded. Similarly, to upgrade the main controller 135 through the wall controller 129, SD card 173 must be installed to provide temporary memory storage.

The main controller 135 also controls a stepping driver 177 that operates electronic expansion valve 179. The electronic expansion valve 179 controls the flow of the refrigerant inside the system. The operation of the electronic expansion valve 179 is controlled by the temperature entering the evaporator 101 and the temperature entering the compressor 67 (see FIG. 5). The electronic expansion valve 179 is opened or closed to maintain a certain temperature range between the evaporator inlet and the compressor inlet. The electronic expansion valve 179 acts like a modulating valve.

As an alternative to the motor control system 139 operating the indoor fan 155, an indoor fan 181 may be pulse width modulated by motor control 183 inside of main controller 135.

The heater board 143 energizes and de-energizes the reversing valve 185. Assuming the variable refrigerant package 21 has been in the cooling mode and is switched to the heating mode, the main controller 135 will cause the heater board 143 to switch the reversing valve 185. Communication between the main controller 135 and the heater board 143 is provided by heater communication 145 with the microcontroller 187. From the microcontroller 187, a signal is sent to the reversing valve triac 189 to switch the reversing valve relay 191. A microcontroller 187 that could be used is a Freescale KL02.

Since the microcontroller 187 provides pulse width modulation, the zero cross-detector 193 lets the microcontroller 187 know when the alternating current provided in power input lines 165 crosses the zero axis. If heat is being called for, the microcontroller 187 will operate heater relay drivers 194 to switch heater relays 195 and/or 197, which controls heaters 199 and 201, respectively. A heater silicon controlled rectifier 203 completes the circuit for heaters 199 and/or 201 and is operated by microcontroller 187. A 3.3 volt regulator 192 is provided internally in a heater board 143.

Internally within the main controller 135 are a +3.3 volt regulator 205 and a +5 volt regular 207. Feeding into microcontroller 135 is a number of temperature sensors 209 of the variable refrigerant package 21.

Figure 8A:
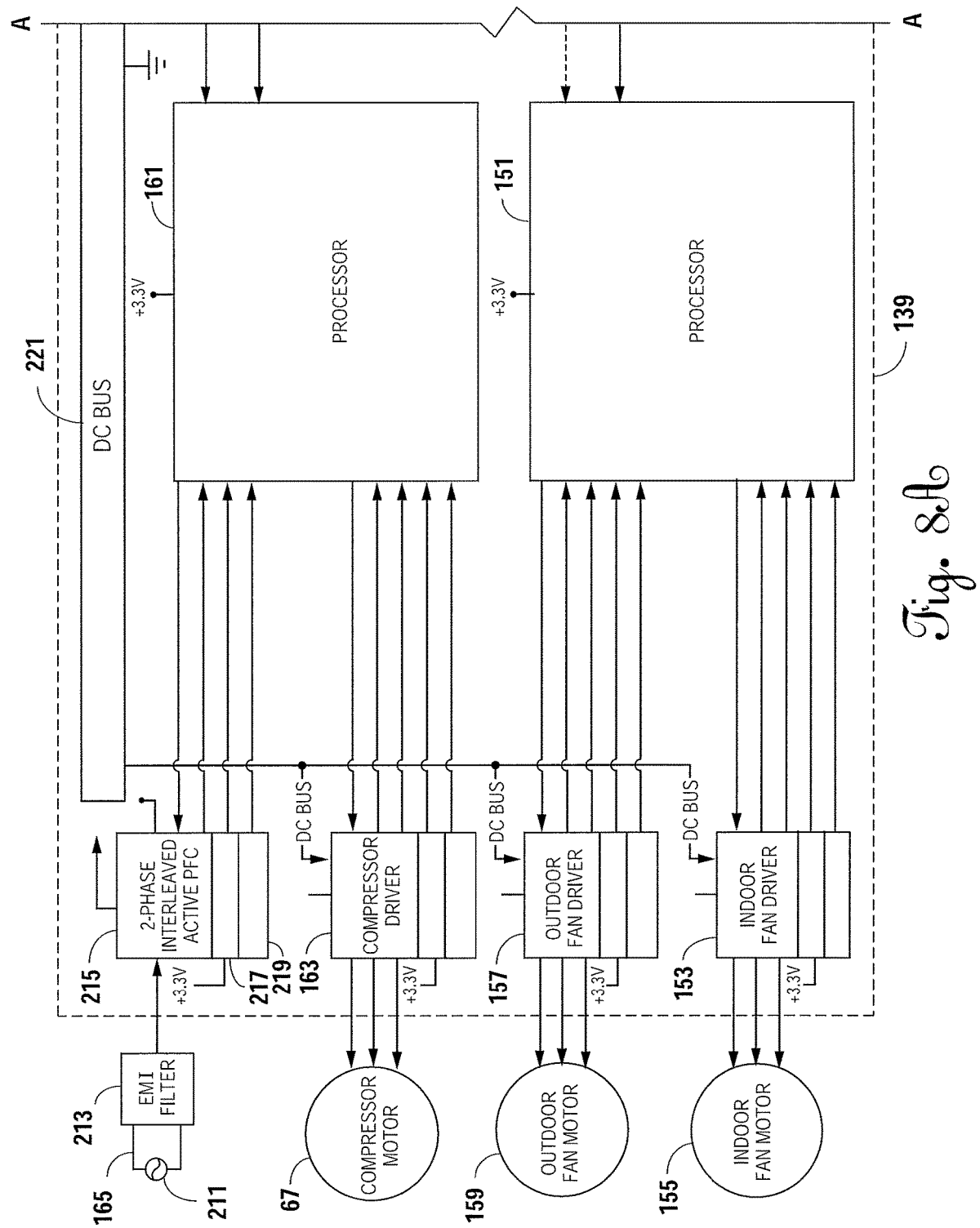
FIGS. 8A and 8B are expanded block diagrams of the motor control system shown in FIG. 7B.
Figure 8B:
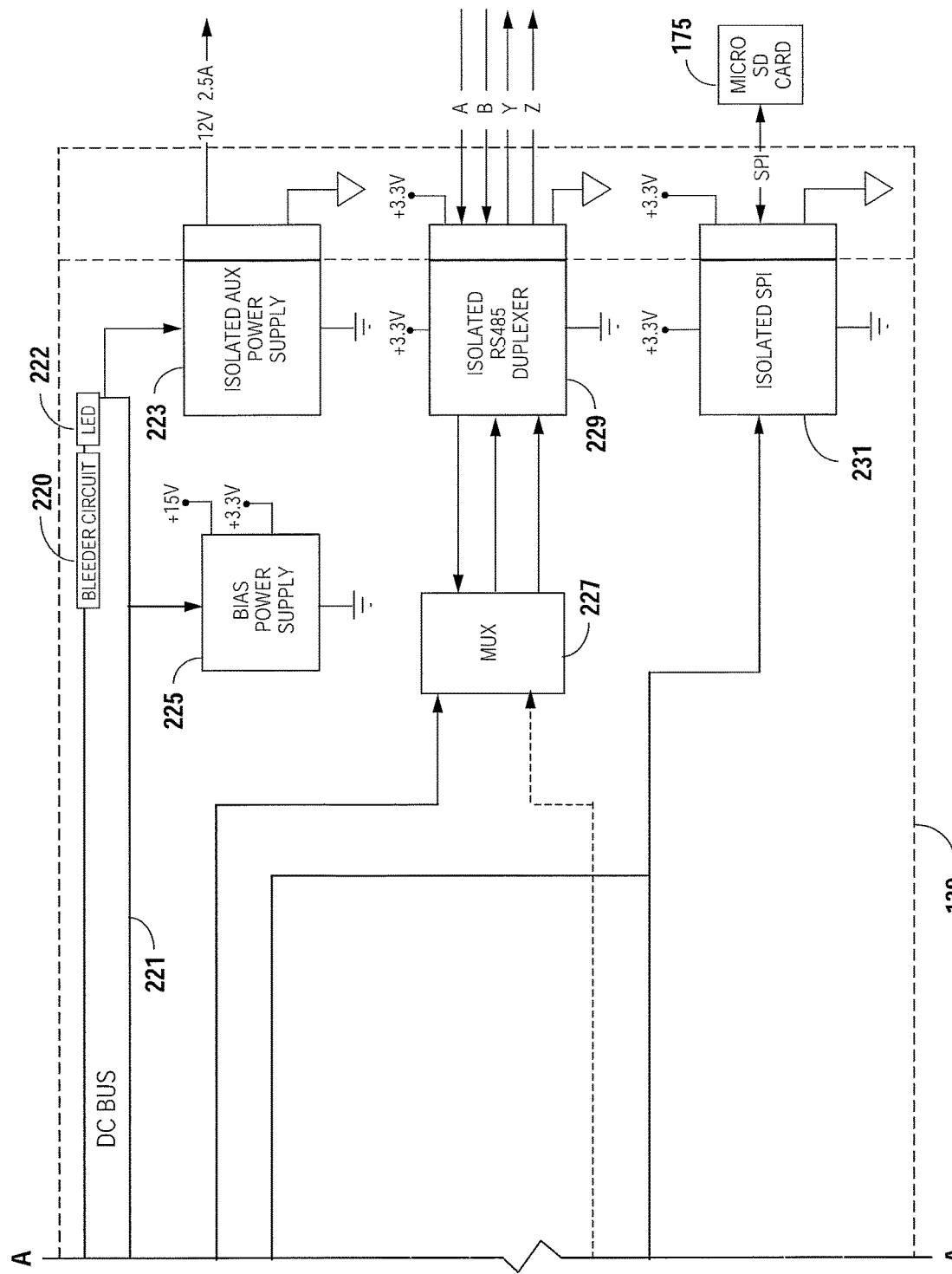

FIG. 8 is a more in-depth review of the motor control system 139. The power input lines 165 connect from an alternating current source 211, which may vary from 180 to 293 volts AC, into the motor control system 139. The alternating current source 211 feeds through an EMI filter 213 prior to connecting to 2-phase interleaved active power factor correction 215. The 2-phased interleaved active power factor correction 215 has a current sensor 217 and a voltage sensor 219. With the current sensor 217 and voltage sensor 219, the power being consumed can continually be determined.

From the 2-phase interleaved active power factor correction 215, a 430 volt DC bus 221 is generated. From the 430 volt DC bus 221, an isolated auxiliary power supply 223 generates +12 volts DC at 2.5 amps.

Inside of motor control system 139 is processor 161 as previously explained in connection with FIG. 7. Processor 161 controls the compressor motor 67 through compressor driver 163. The 430 volt DC bus 221 supplies DC voltage to the compressor driver 163.

Processor 151 controls outdoor fan motor 159 through outdoor fan driver 157 and indoor fan motor 155 through indoor fan driver 153. The processor 151 provides pulse width modulated power via outdoor fan driver 157 to outdoor fan motor 159. Likewise, processor 151 provides pulse width modulated power to indoor fan 155 via indoor fan driver 153.

The motor control system 139 shown in FIG. 8 has an active power factor correction which is provided in part by the 2-phase interleaved active power factor correction 215.

The signal being delivered to the compressor motor 67 through the compressor driver 163 from the processor 161 senses the rotor position inside the compressor 67. The signal being received from the 430 volt DC bus 221 is chopped and converted into a simulated three-phase AC signal to make the motor axis of the compressor 67 spin at the desired rate. The outdoor fan driver 157 for the outdoor fan motor 159 is doing essentially the same thing by taking the signal from the 430 volt DC bus 221, chopping it and providing a simulated three-phase AC current to the outdoor fan motor 159. Likewise, the indoor fan driver 153 does essentially the same thing for the indoor fan motor 155. While the compressor driver 163 is being controlled by processor 161, outdoor fan driver 157 and indoor fan driver 153 are being controlled by processor 151.

A bias power supply 225 receives voltage from 430 volts DC bus 221 and generates +15 volts DC and +3.3 volts DC, which is used to supply power to any part of the variable refrigerant package 21 that may need those voltage levels. The +3.3 volt DC is used to operate processors 161 and processor 151.

All of the conditioning of the power received and converted to DC signals is done inside of the motor control system 139. While the bias power supply 225 generates +15 volts and +3.3 volts, multiplexer 227 has an isolated RS-485 duplexer 229 for connection to an external device. The external device may be similar to the personal computer 149 shown in FIG. 7. The isolated RS-485 duplexer 229 allows for external connections and controls to the motor control system 139. Also, the motor control system 139 has an isolated serial peripheral interface 231 that may connect to a micro SD card 175. The SD card 175 may be used to update the motor control system 139, check error messages and exchange information therewith.

The motor control system 139 is where all of the power conversion is done. This is where the drivers 163, 157 and 153 are all located. This is where regulated power is generated from a highly unregulated source.

When the variable refrigerant package 21 is turned OFF so the alternating current source 211 no longer connects through the EMI filter 213 to the 2-phase interleaved active power factor correction 215, inductive or capacitive charges may still remain in the circuit. A bleeder circuit 220 is provided through which the inductive and/or capacitive charges may drain down. The LED 222 will remain lit until the bleeder circuit 220 has fallen below a predetermined current.

Figure 9:
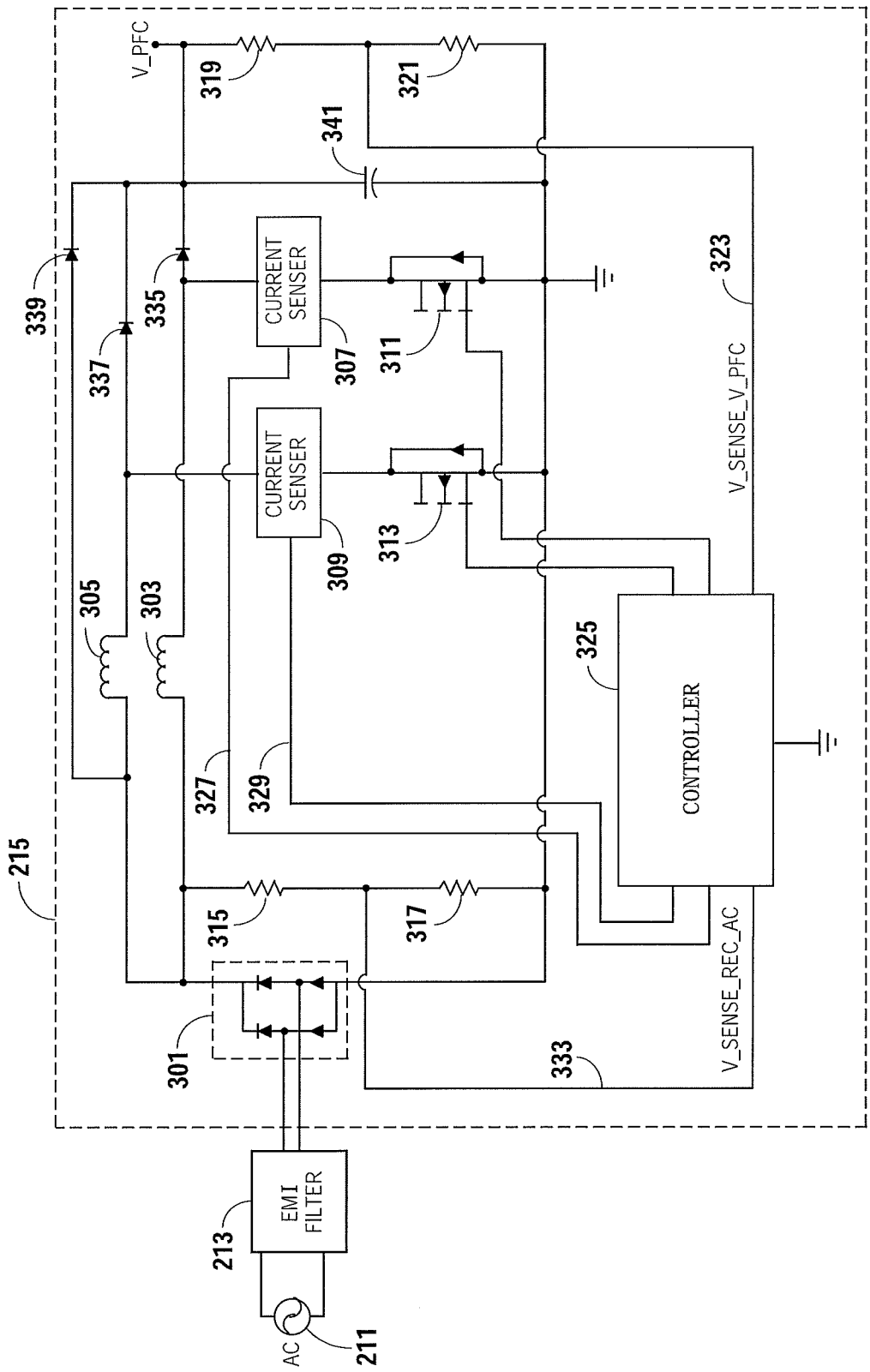
FIG. 9 is an expanded block diagram of the power factor correction shown in FIG. 8A.

Turning now to FIG. 9, a schematic view is shown of the 2-phase interleaved active power factor correction 215. The alternating current source 211 feeds through the EMI filter 213 to the 2-phase interleaved active power factor correction 215. Within the 2-phase interleaved active power factor correction 215, the alternating current is changed by a full wave rectifier 301 to a rectified AC signal. The rectified AC signal from the full wave rectifier 301 feeds through inductors 303 and 305. The inductors 303 and 305 are connected to current sensors 307 and 309, respectively. Each current sensor 307 and 309 connects to MOSFETs 311 and 313, respectively.

Resistor network on the front of the N-phase interleaved active PFC 215 are resistors 315 and 317. While resistors 315 and 317 provide sensing on the front end of the two-phase interleaved active PFC 215, resistors 319 and 321 provide a feedback voltage 323 to a controller 325. The controller 325 also receives a current sense 327 from current sensor 307 and current sense 329 from current sensor 309, respectively. Further, the controller 325 receives the input voltage 333 as developed across input resistors 315 and 317.

Diodes 335, 337 and 339 insure that current only flows in one direction to capacitor 341.

The controller 325 monitors the input voltage 333, feedback voltage 323, along with current sense 327 and 329 to decide if the power factor needs to be corrected. The controller 325 controls the point at which each of the MOSFETs 311 and/or 313 are fired to get the maximum power factor. The maximum power factor is when the current and the voltage are in phase with each other. An example of such a controller 325 that can control the firing of MOSFETs 311 and 313 is a Texas Instrument, Part No. UCC-2807.

The controller 325 is taking the feedback voltage 323 and the input voltage 333 and comparing them with the current sense 327 and 329 and firing the MOSFETs 311 and 313 to get a power factor as close to 1 as possible.

"Power factor" in an AC electrical power system is the ratio of real power flowing to the load versus apparent power in the circuit. A power factor of less than 1 means the voltage and current wave forms are not in phase. Real power is the capacity of the circuit for performing work in a particular time. Apparent power is the product of the current load of the circuit. In an electrical power system, a load with a low power factor draws more current than a load with a high power factor. Higher currents increase the energy loss in the system. The present system uses an active power factor which is built into the power consuming portion of the variable refrigerant package 21. In the 2-phase interleaved active power factor correction 215, there is continuous "ebb-and-flow" of the reactants (capacitive and inductive). The power factor will continue to change unless there are corrections in the power factor. The present invention uses a 2-phase interleaved active factor correction 215, but could use a single phase or other multi-phase configurations.

In FIG. 9, the unregulated AC voltage being received from alternating current source 211 is taken and converted into a regulated DC output voltage by using a switched mode power supply. The DC voltage is regulated even though the AC voltage may vary over a broad range. For example, the AC voltage can vary from 180 volts AC to 293 volts AC, yet the DC bus will be maintained at 430 volts DC.

Figure 10:
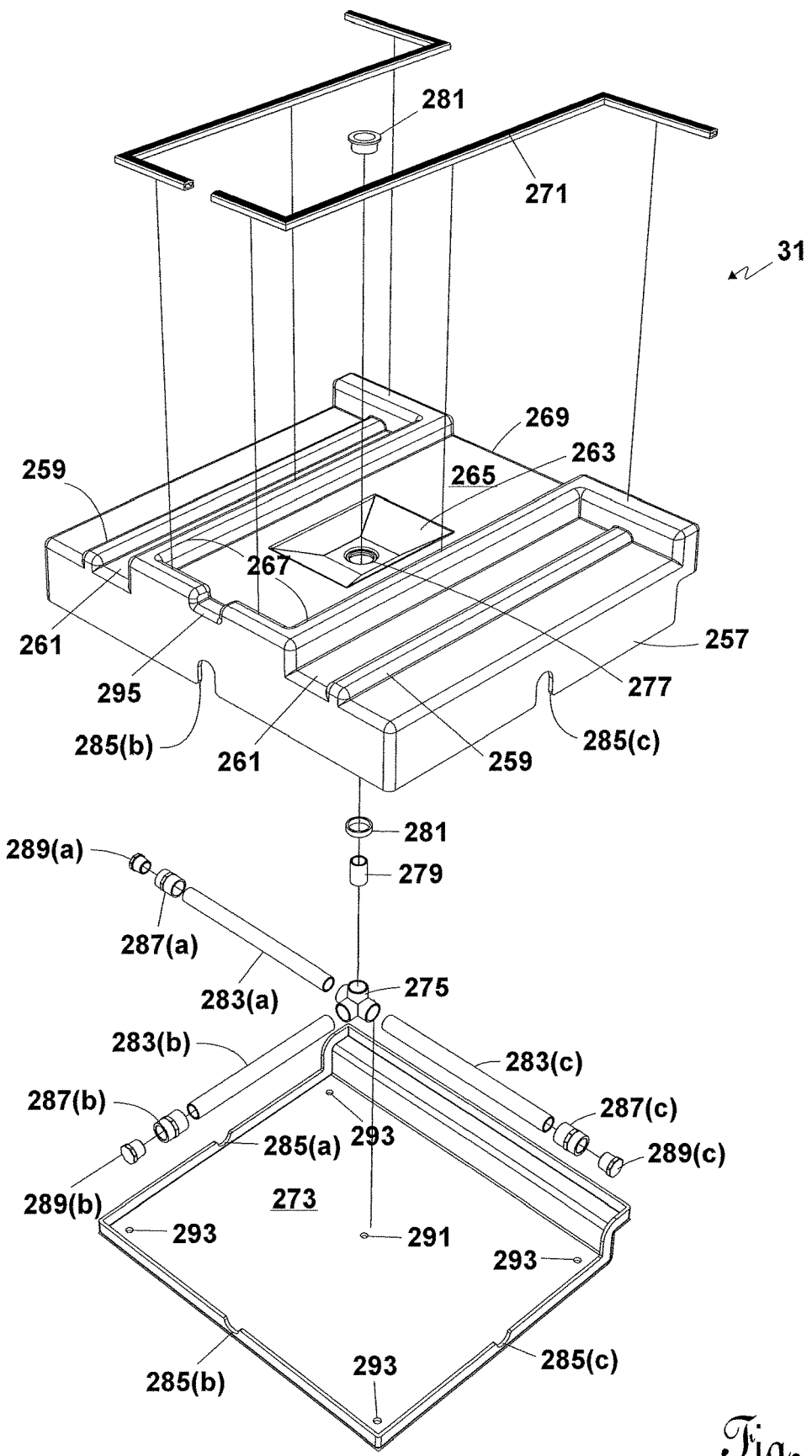
FIG. 10 is an exploded perspective view of a base for the variable refrigerant package.

Referring to FIG. 10, and exploded perspective view of the base 31 is shown. The base 31 has a hard plastic top 257 which is fairly thin. The hard plastic top 257 has ribs 259 formed on either side thereof. The ribs define a channel 261 on each side of the hard plastic top 257 of the base 31.

A drain basin 263 is provided in the internal trough 265 provided inside of raised rib seat 267. One end of the internal trough 265 provides outdoor drain access 269. Sealing the top of the raised rim seat 267 to the underside of the variable refrigerant package 21 is chassis seal 271.

On the underside of the base 31 is located bottom cover 273. Between the bottom cover 273 and the hard plastic top 257 is located a three-way tee 275 that connects to drain hole 277 of drain basin 263 via drain connecting tube 279 which connects to retaining rings 281. Connected to the lower side of the three-way tee 275 are building drain tubes 283 (*a*), (*b*) and (*c*). Building drain tubes 283 are held into slots 285 (*a*), (*b*) and (*c*), respectively, by retaining rings 287 (*a*), (*b*), and (*c*), respectively. The ends of the filling drain tubes 283 are temporarily sealed by end caps 289 (*a*), (*b*) and (*c*), respectively.

When assembled, a two-part expanding foam is injected between hard plastic top 257 and bottom cover 273 through injection port 291 until a portion of the two-part expanding foam can be seen at each of the outlet ports 293. The two-part expanding foam (not shown) gives rigidity to the base 31 so that it can support the variable refrigerant package 21.

When installed, the installation rails 55 (see FIG. 3) will rest inside of channels 261. When installing the base 31, the end cap 289 (*a*), (*b*), or (*c*) that is the most convenient to the building drain system is removed and the appropriate building drain tube 283(*a*), (*b*) or (*c*) is connected to the building drain system (not shown). By having the drain basin 263 drain to any of three sides of the base 31, it is more convenient for the construction crew to connect to the building drain system.

If the building drain system becomes clogged, the outdoor drain access 269 extends over the inside edge of the plenum 37 so that any accumulated moisture will drain outside the building. Thereafter, if service personnel sees the drainage flowing through the plenum 37 to outside the building, the service personnel will know that the drain system for that particular room is clogged and needs to be cleaned. However, no damage will have been caused inside the room.

When installing the variable refrigerant package 21, a notch 295 is provided in the raised rib seat 267. This notch 295 allows the lower end of the evaporator drain tube 105 to move there through when being installed until the lower end of the evaporator drain tube 105 is just above the drain basin 263. After installation of the variable refrigerant package 21 a piece of foam may be placed inside of notch 295.

Figure 11:
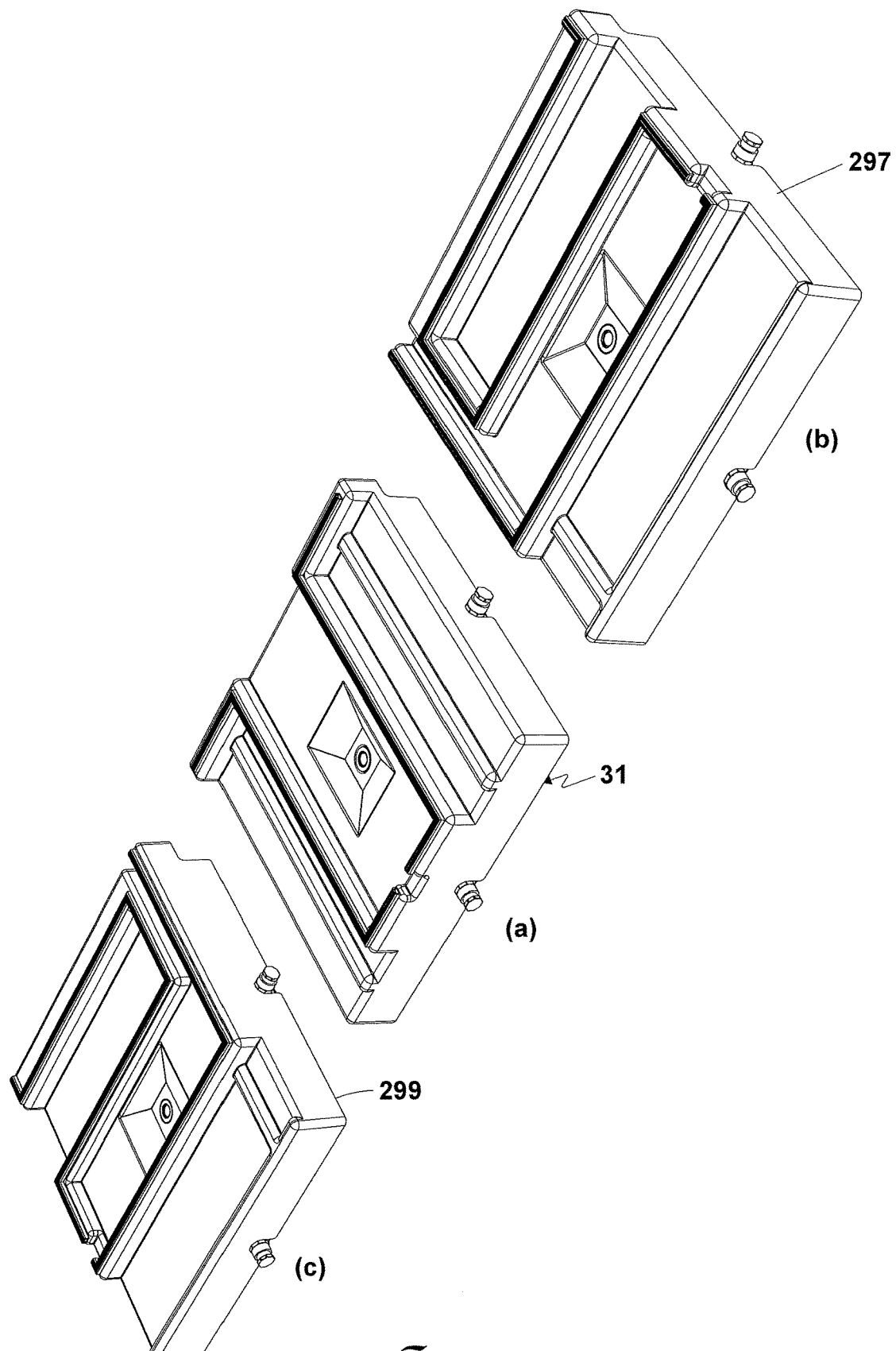
FIG. 11 shows alternative perspective views of three different bases that can be used with the variable refrigerant package.

Because hotel/motel rooms may be different, the shape of the base 31 may need to be different to accommodate different plenum 37 and door openings 35 being located on different sides of the closet 23. Referring to FIG. 11, base 31 in FIG. 11(*a*) is the straight install base. FIG. 11(*b*) is the right install base 297. FIG. 11(*c*) is the left install base 299. Each of the bases 31, 297 and 299 allows for access water to drain outside of the building if the normal drain line is plugged. At the time of construction, the contractor will decide which style base 31, 297 or 299 will be used.

What I claim is:

1. A method of installing a variable refrigerant package through a door in a closet located adjacent an outside wall in new construction of rooms for hotels/motels having a building drain, a power source and heating/cooling ducts, said method including the following steps:

first installing a plenum through said outside wall to an inside of said closet;

second installing a duct adapter on an end of said heating/cooling duct near a top of said closet;

selecting a base having a configuration commensurate with said closet in which said variable refrigerant package is to be installed;

securing said base in a bottom of said closet, said base having a drain basin in a top thereof connected to said building drain, said drain basin overlapping said plenum to provide secondary drainage through said plenum if said building drain becomes clogged, said base not being attached to said variable refrigerant package;

locating a wall controller inside said room with a connection to a thermostat plug inside said closet;

third installing said variable refrigerant package through said door of said closet so that (a) said variable refrigerant package presses against a plenum gasket, (b) said variable refrigerant package rests on a base gasket of said base with an evaporator drain terminating above said drain basin, said base gasket being located on top of a raised rim seat, (c) said duct adapter is connected to supply duct flanges, and (d) said variable refrigerant package is plugged into said power plug and said thermostat plug; said third installing step has installation rails mounted under said variable refrigerant package which during said third installation are received in channels found in said top of said base, said installation rails holding said variable refrigerant package in position;

wherein said variable refrigerant package comprises at least one fresh air module having a fan comprised of a fan blade and a motor within a housing, said fan in communication with a chamber within said at least one fresh air module, and wherein said at least one fresh air module is located between said outside air and said path for said indoor entering air, said at least one fresh air module drawing a portion of said outside air there through, and mixing the portion of said outside air with said indoor entering air in front of an evaporator so that said evaporator will remove moisture from said the portion of said outside air flowing there through, a reheater coil in communication with said evaporator, said reheater coil providing active dehumidification of a portion of said mixed air, a condenser fan, at least one of a blower assembly and/or a compressor being variable in speed by pulse width modulation;

providing a notch in said raised rim seat, said notch to receive a lower end of said evaporator drain there through, said lower end of said evaporator drain plugging said notch; and wherein said installation may be completed by non-certified personnel.

2. The method of installing a variable refrigerant package as cited in claim 1 wherein said connecting of said drain basin to said building drain includes the step of selecting one of multiple building drain tubes connected to said drain basin, each of said one of multiple building drain tubes having an end cap thereon, removing said endcap of said selected one of multiple building drain tubes, only said selected drain tube being connected to said building drain.

3. The method of installing a variable refrigerant package as cited in claim 2 said first installing includes the step of dividing said plenum between outside air drawn into said variable refrigerant package and air being discharged to outside, said dividing being by plenum divider baffle.

4. The method of installing a variable refrigerant package as cited in claim 3 wherein said plenum is telescoping with a lower part sloping toward an outside wherein said overlapping of said drain basin with said plenum causes moisture to drain towards said outside.

5. The method of installing a variable refrigerant package as cited in claim 4 including a last step of closing a door on said closet, which door has return air duct for allowing air flow from said room to said variable refrigerant package.

* * * * *